United States Patent [19]

Estabrook et al.

[11] Patent Number: 4,888,539
[45] Date of Patent: Dec. 19, 1989

[54] CLUTCH/DAMPER

[75] Inventors: Robert M. Estabrook; Terrence J. Furtmann, both of Glendale; Svenn A. Norstrom, Phoenix, all of Ariz.

[73] Assignee: Honeywell Inc., Minneapolis, Minn.

[21] Appl. No.: 45,635

[22] Filed: May 4, 1987

[51] Int. Cl.⁴ .............................................. G05B 19/40
[52] U.S. Cl. ..................................... 318/685; 318/628; 464/45; 464/47; 74/125.5
[58] Field of Search ............... 318/685, 584, 628, 687, 318/696; 74/122, 127, 574, 125.5; 464/38, 43, 44, 92, 96, 37, 39, 40, 41, 42, 45, 46, 47, 48

[56] References Cited

U.S. PATENT DOCUMENTS

| | | | |
|---|---|---|---|
| 788,810 | 5/1905 | Ambler | 464/44 |
| 804,778 | 11/1905 | Smith | 464/44 |
| 875,800 | 1/1908 | Gilson | 74/574 |
| 954,774 | 4/1910 | Beard | 464/38 |
| 1,107,731 | 8/1914 | Vold | 74/574 |
| 1,923,360 | 2/1931 | Fitzgerald et al. | 74/574 |
| 2,051,442 | 8/1936 | Geyer | 464/92 |
| 4,100,472 | 8/1978 | Mobley | 318/685 |
| 4,182,138 | 1/1980 | McGuire | 74/574 |

Primary Examiner—William M. Shoop, Jr.
Assistant Examiner—Brian K. Young
Attorney, Agent, or Firm—Arnold L. Albin

[57] ABSTRACT

A clutch/damper for isolating and absorbing vibration induced reactive torques from adversely affecting a motor drive system. A friction plate variably engages a gear coupled to the drive motor and to a load mass to permit normal drive in the absence of excessive reactive torque forces and to allow the motor to continue to drive against a slipping load in the presence of excessive reactive torque forces. Feedback is employed in the drive system to compensate for the small errors induced by the slippage.

4 Claims, 2 Drawing Sheets

CLUTCH/DAMPER

BACKGROUND OF THE INVENTION

1. Field of the Invention

The invention relates generally to shock and vibration isolators, and more particularly to a clutch/damper for isolating the oscillatory reactive forces of a driven mass from the driving motor.

2. Description of the Prior Art

There are many applications in which energy from a drive motor is applied through a gear train to drive a load mass and wherein, when subjected to environmental vibrations, the mass exhibits reactive forces which are coupled through the gear train and adversely affect the driving motor. When the system resonates, reactive torques are induced in the driving motor which may cause the motor to stall or actually be driven backwards. High reliability stepper motors have been commonly applied for drive systems because they are relatively inexpensive and the drive system electronics are less complex than for alternating current or DC current variable speed motors. It has been found, however, that for a given motor size, less drive torque is available than with corresponding alternating current or direct current motors, and the speed-torque characteristics of the stepper motors are not as advantageous. In order to overcome the presence of the reactive torques, the prior art applied a frictional damper in parallel with the drive system or simply utilized a grossly increased in size drive motor to over-power the feedback torque. These solutions have the disadvantage that the use of larger motors, which are in themselves a component of the suspended mass, increases the driven mass, thereby aggravating the problem, and a parallel friction damper requires additional motor torque to overcome the friction.

FIG. 1 exemplifies the problem as applied to a radar apparatus. A base 10 houses the electronics for driving an azimuth motor and gear train 18 and elevation motor and gear train 22, and other electronics. The base 10 is supported against vertical wall 14 by vibration and shock isolators 12. An azimuth support structure 16 has mounted thereon the azimuth motor and gear train 18 and is provided with a pivot 20 for supporting an R.F. section 26 of a radar receiver/transmitter. The R.F. section 26 pivots in elevation on elevation pivot 24 about an axis x—x so as to permit scanning of the receiver/transmitter platform 28 in a vertical direction with simultaneous pivoting in the azimuth direction about azimuth pivot 20.

Antenna 27 is also supported by the platform 28. While the combination of the antenna and receiver/transmitter into one assembly eliminates the need to run waveguides from the antenna to the receiver/transmitter, difficult vibration problems result in the antenna drive system. It may be seen that the R.F. generating and receiving components are located on the elevation gimbal of the platform 28. This creates an additional mass which must be energized by the drive system and, in practical applications, these components are very sensitive to vibration and therefore must be isolated from the vibration environment. Since it is not feasible to isolate just the R.F. components in this design, isolation has been provided by the mounts 12 between the base and electronics 10 and the aircraft mounting interface 14. However, since the center of mass of the system lies at a point 30 which is not co-planar with the vibration isolators, the unit tends to oscillate about a point below the isolator mounting plane under vibration. This oscillation generates substantial accelerations in the R.F. section 26, which are then transmitted as reaction torques through the drive systems to the respective azimuth and elevation motors.

The present invention overcomes the disadvantages of the prior art by decoupling the load mass from the driving motors when the reaction torques exceed a predetermined level, and by allowing the load mass to be driven by the drive motors when the reaction torques are less than the predetermined level.

SUMMARY OF THE INVENTION

The present invention interposes a clutch/damper element to absorb momentary reaction torques exceeding a predefined motor torque limit and thereby permits the utilization of low cost, high reliability, conventional stepper motor drive systems. It is adapted for use between the gear reduction train of the drive and the driven mass. In a preferred configuration, the vibration energy is dissipated by the generation of frictional energy. In a further preferred embodiment, a torsional member in the clutch/damper provides absorption of at least a portion of the vibration energy, while restoring the relative positions of the drive shaft and driven mass when the reaction torque subsides.

The present invention comprises a first member coupled to a motor and adapted for rotary motion. A drive member is coupled to the first member and rotates about an axis. An energy absorbing member is coupled between the driving member and an output shaft forwardly transferring the driving force to the driven mass so long as a predetermined slip torque is not exceeded. At a predetermined value of slip torque, the energy absorbing member, resiliently coupled to the driving member and the output member, permits rotation of the driving member between friction surfaces, thereby limiting the torque back-driven to the motor to the predetermined slip torque.

In a further preferred embodiment, the energy absorbing member comprises a pair of elastomeric bodies bonded to the drive member and the output shaft to permit resilient coupling of the first member to the driven mass when the allowable reaction torque is exceeded. Upon dissipation of the reaction torque, the resilient body causes the drive member in the output shaft to be aligned to corresponding angular positions.

DESCRIPTION OF THE PREFERRED EMBODIMENT

Figure 3:
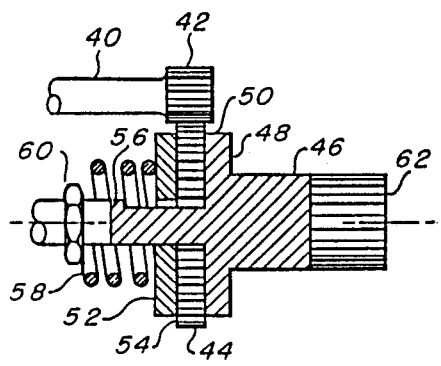
FIG. 3 is a view in cross-section of a preferred embodiment of the present invention employing a friction disk.

Referring now to FIG. 3, a clutch/damper for control of angular reaction torques applied by a motor-driven mass to a drive motor includes a shaft 40 coupled to a drive motor, not shown, and a gear, which may be a spur gear 42, for applying rotary motion to a drive gear 44 which meshes with spur gear 42. An output shaft 46 rotates about an axis y—y and has a member 48 having a slip surface 50 for frictionally engaging the drive gear 44. Opposing the member 48 is a friction plate 52 slideably engaged with a second surface 54 of drive gear 44. Friction plate 52 is translatably slideable across a shaft 56 also rotatable about axis y—y. Friction plate 52 is keyed to shaft 56 to permit sliding along the axis y—y while maintaining the same angular velocity as the output shaft 46. A spring 58 is compressed by locknut 60 to apply a predetermined force to friction plate 52 thereby engaging the drive gear 44 with the diskoidal member 48. Thus, the spur gear 42 engaged with drive gear 50 will also drive shaft 46. A third gear 62 on output shaft 46 engages the driven load mass. When the load mass, not shown, is subject to oscillatory vibration and exhibits a reaction torque in excess of a predetermined value determined by the compressive force applied by locknut 60, shaft 46 will rotate with respect to gear 44. The reactive energy transferred to shaft 46 will be dissipated as frictional energy at friction surfaces 50 and 54.

Figure 2:
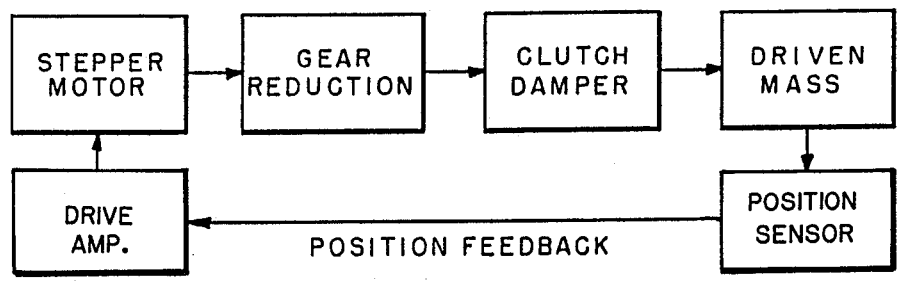
FIG. 2 is a schematic representation in block form of a mechanical drive system including a clutch/damper of the present invention.

Since, when the reaction torque value exceeds the clutch setting, shaft 46 will rotate with respect to gear 44, there will be an angular displacement between the relative positions of shaft 42, coupled to the drive motor, and gear 62, coupled to the load. Since accurate pointing of the radar antenna requires maintaining precise alignment of the input drive and output load, it is desirable to interpose a feedback loop by providing a control signal that is responsive to the angular position of the load. The control signal may be generated by any of the well known sensors, such as a tachometer, optical disk, or similar devices which are well known by one skilled in the art. This positional signal is then applied to energize an amplifier coupled to the drive motor in a closed servo loop as shown in FIG. 2, so as to urge the drive motor and the load into angular alignment.

It will be seen that the slipping action of the clutch limits the level of back drive torque to the drive motor to a level that it is capable of driving and absorbs or damps the energy of the back drive torque above that level. Because the vibration induced loads will act in an essentially sinusoidal fashion, the clutch damper will slip first clockwise and then counterclockwise approximately maintaining the relative position of the driven mass. The feedback circuit then maintains the precise relative positions. In this way, the clutch/damper allows the use of a smaller motor to drive a given mass, thereby reducing the cost and complexity of the drive system as well as the size.

Figure 1:
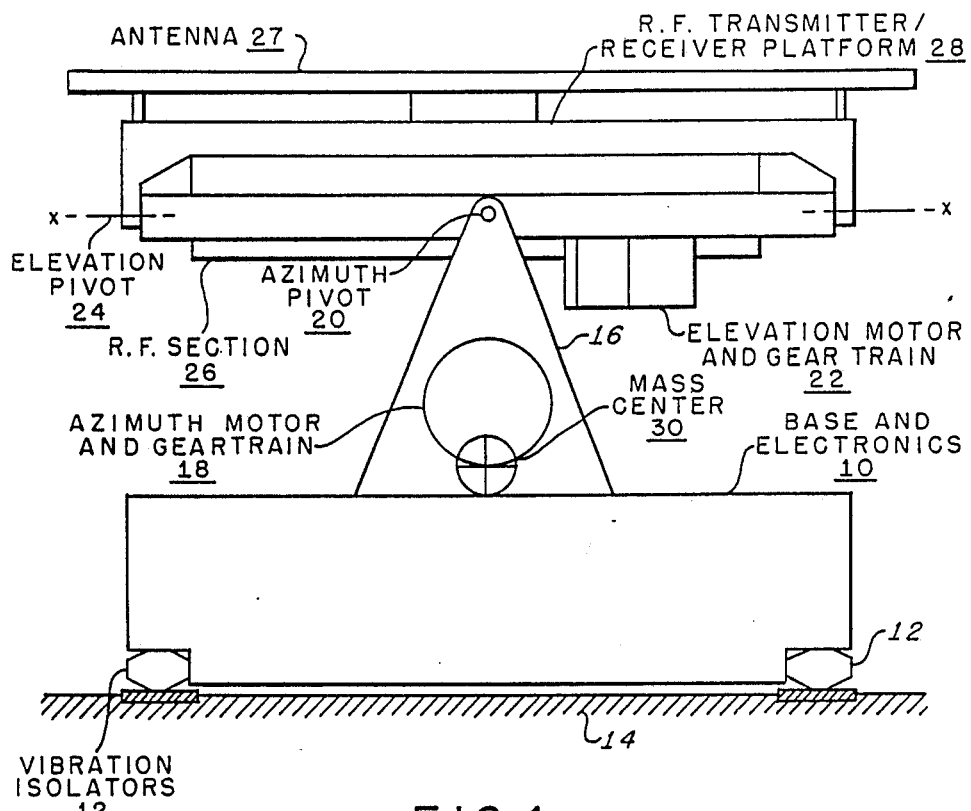
FIG. 1 is a pictorial representation in plan view of a radar system employing a gear train to angularly displace a receiver/transmitter platform.
Figure 6:
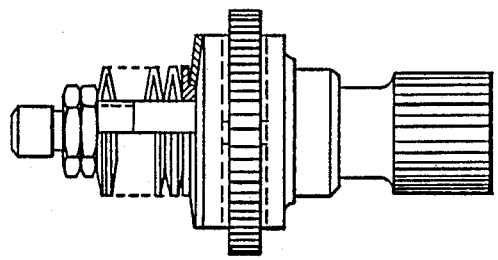
FIG. 6 is a pictorial view in partial section of the Clutch/Damper of FIG. 3.

FIG. 6 shows a drawing to a scale of 4/1 of an actual embodiment of the clutch/damper depicted schematically in FIG. 3, from which the simplicity of construction and compact size may be readily appreciated.

Figure 4:
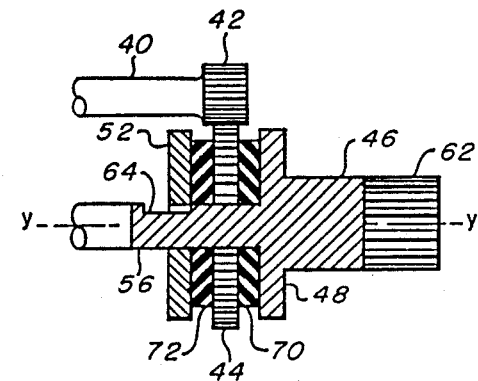
FIG. 4 is a view in cross-section of a further preferred embodiment employing an elastomer torque energy absorbing disk.
Figure 5:
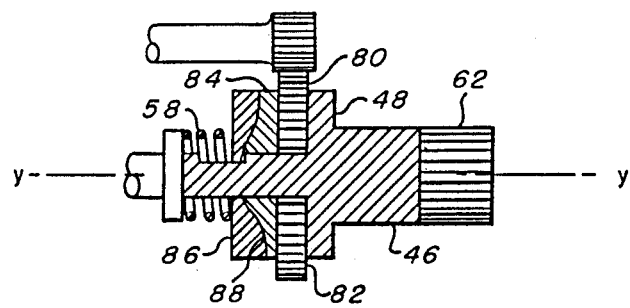
FIG. 5 is a view in cross-section of a still further preferred embodiment employing a spring/ramp configuration as the energy absorbing member.

Further embodiments, shown in FIGS. 4 and 5, offer the advantage of incorporating resilient elements which urge the driven mass back to its original angular location when the reaction torque subsides, thereby reducing or eliminating the need for position feedback. Referring now to FIG. 4, in which like reference numbers refer to like elements in FIG. 3, the drive gear 44 is sandwiched between elastomeric bodies 70 and 72. Elastomeric bodies 70 and 72 are adhesively affixed to opposite faces of gear 44. In a like manner, the opposing faces of elastomeric bodies 70 and 72 are adhesively affixed to the proximal faces of plate 52 and output member 48. It may be seen that drive gear 44 is free to rotate on shaft 56, while plate 52 is free to translate along axis y—y but constrained from rotary motion relative to shaft 56 by keyway 64. When gear 62 is subjected to a backdrive torque from the load mass, gear 62 and shaft 46 rotate with respect to gear 44. However, due to the torsional compliance of the elastomeric bodies 70 and 72, a portion of the reactive energy is absorbed in deforming the elastomeric material. When the reaction torque subsides, bodies 70 and 72 urge gear 44 and shaft 46 back into alignments, so that gears 42 and 62 are angularly aligned without the requirement for positional feedback.

In a third preferred embodiment, shown in FIG. 5, a drive gear 80 has a planar surface 82 engaged for rotation with member 48 of output shaft 46. An opposing face 84 of drive gear 80 has an inclined surface with respect to the planar surface 82. Face 84 extends along a contour varying axially in a spiral fashion from a minimum depth at the circumference of gear 80 to a maximum depth at the axis of rotation thereof. A ramp disk 86 has a corresponding inclined surface 88 for engaging the surface 84 of drive gear 80. Surface 88 has a contour varying axially in a spiral fashion from a predetermined maximum depth at the circumference to a predetermined minimum depth at the axis of rotation, so that the inclined surfaces 84 and 88 are substantially coincident. When ramp disk 86 is rotated with respect to drive gear 80, the inclined mating surfaces will tend to drive ramp disk 86 to compress spring 58 against locknut 60. It may be seen, therefore, that reaction torques applied to gear 62 and shaft 46 will be expended in the rotational friction between surfaces 84 and 88 and in compressing spring 58 while gear 80 rotates on shaft 46, displacing ramp disk 86. When the reaction force is dissipated, spring 50 will tend to urge disk 86 and gear 80 back into alignment. Therefore, as in the case of FIG. 4, the need for positional feedback is minimized.

Referring again to FIG. 2, it will be appreciated that the present invention incorporates a simple mechanism, compared to the prior art measures previously discussed, for absorbing reactive energy from an oscillatory load mass. The clutch/damper may be installed in a series arrangement between the drive gears and the driven mass, therefore there is no lost energy required for overdriving the stepper motor and alternate embodiments may reduce the need for position feedback.

While the invention has been described in its preferred embodiments, it is to be understood that the words which have been used are words of description rather than limitation and that changes may be made within the purview of the appended claims without departing from the true scope and spirit of the invention in its broader aspects.

Embodiments of an invention in which an exclusive property or right is claimed are defined as follows:

1. Apparatus for control of angular reaction torques applied by a motor-driven mass to a drive motor, comprising: input means coupled to said motor and adapted for rotary motion about a first axis, drive means having first and second substantially coplanar radially disposed friction faces and adapted for rotary motion about a second axis, output means adapted for rotary motion about said second axis and coupled to energize said driven mass, wherein said output means comprises an axial shaft having a plate affixed laterally thereto, said plate having a substantially planar radially disposed face, rotatably engaging said first face of said drive means, energy absorbing means for coupling said drive means to said output means, said energy absorbing means allowing free transfer to said output means of rotary energy applied to said drive means by said input means so long as a predetermined slip torque is not exceeded, and for absorbing transfer of energy stored in said driven mass to said input means when said predetermined slip torque is exceeded, and positional feedback means including a sensor coupled to said driven mass for providing a control signal representative of an angular position of said driven mass to said drive motor and motive power means responsive to said control signal for incrementally positioning said drive motor so as to restore the relative angular positions of said output means with respect to said input means when said driven mass is angularly displaced by said reactive torque, said energy absorbing means cooperating in series relationship with said feedback means and with said drive means and said output means to provide clutch means for damping excursions of said drive motor and coupling of reactive torques between said drive motor and said driven mass in excess of a predetermined value.

2. The apparatus as set forth in claim further comprising:

gear reduction means for providing rotary motion from said motor means, first gear means coupled to said gear reduction means for providing further rotary motion to said motor-driven mass and having first and second co-planar friction surfaces radially disposed for free rotation with respect to an axial shaft, output shaft means engaging further gear means for driving said mass in oscillatory motion and a further planar friction surface disposed radially upon said shaft means, friction disk means for engaging one of said friction surfaces of said first gear means, and spring means cooperating with said friction disk means and including adjusting means for compressing said spring means so that said friction disk is further urged to engage said friction surface of said output means, said adjusting means adapted for applying a predetermined compression force to said friction disk so that said output shaft is rotatably disengaged from said first gear means when said portion exhibits at least a predetermined reactive force upon said output shaft and said output shaft is rotatably engaged with said first gear means when said portion exhibits a reactive force less than said predetermined reactive force, said reactive force when exceeding said predetermined reactive force substantially absorbed by frictional dissipation within said clutch damper means.

3. The apparatus as set forth in claim 1, further comprising:

said energy absorbing means further comprising resilient means for providing a substantially sinusoidal restoring torque for maintaining the relative angular positions of said output means with respect to said input means, said input means further comprising first gear means, said drive means further comprising second gear means meshed with said first gear means and having first and second radially extending substantially planar faces, said resilient means comprising first and second diskoidal bodies of elastomeric material, said first body disposed between said planar face of said plate and said first planar face of said second gear means, further comprising backing plate means, comprising a substantially rigid planar plate distally mounted on said axial shaft from said plate and said driven mass, said second body of elastomeric material disposed between said backing plate means and said second planar face of said second gear means, means for affixing said first body of elastomeric material to said planar face of said plate of said axial shaft and to said first planar face of said driven means, and means for affixing said second body of elastomeric material to said backing plate means and said second planar face of said drive means, so that said input means resiliently engages said driven mass, and said drive means is rotatably displaced with respect to said output means when subjected to a reactive torque from said driven mass, whereby said input means is substantially disengaged from said driven mass when said reaction torque exceeds a predetermined value, and said input means is substantially engaged to said driven mass when said reaction torque is less than said predetermined value, whereby said first and second bodies of elastomer material urge said output means to rotate at the same angular velocity and relative angular displacement as said drive means when said reactive torque is dissipated.

4. Apparatus as set forth in claim 11, further comprising:

said input means further comprising first gear means, said drive means further comprising second gear means meshed with said first gear means and having a first substantially planar face and a second face having an inclined surface with respect to said planar face, said surface having a contour varying in spiral fashion from a predetermined minimum dimension at the circumference of said second gear means to a predetermined maximum dimension at said second axis, ramp disk means having a first face with an inclined surface having a contour substantially coincident with said inclined surface of said second gear means, the contour of said ramp disk means varying in spiral fashion from a predetermined maximum dimension at said circumference to a predetermined minimum dimension at said second axis, said ramp disk means in operation transversely slideable upon said axial shaft and fixed for angular rotation coincident with said shaft, and spring compression means for applying a predetermined compressive force to said ramp disk means for urging said inclined surface of said ramp disk means in frictional contact with said inclined surface of said second gear means, so that said ramp disk is axially displaced on said axial shaft when said reactive torque exceeds a predetermined value, thereby allowing substantially free rotation of said driven mass with respect to said input means, and said ramp disk is frictionally engaged with second gear means when said reaction torque is less than said predetermined value, thereby tending to urge said output means to substantially identical angular velocity and displacement with respect to said drive means.

* * * * *